US006986447B2

(12) United States Patent
Truong

(10) Patent No.: US 6,986,447 B2
(45) Date of Patent: Jan. 17, 2006

(54) TELEVISION TOTE BAG

(75) Inventor: Peggy Truong, Newark, NJ (US)

(73) Assignee: Motion Systems, LLC, New York, NY (US)

( * ) Notice: Subject to any disclaimer, the term of this patent is extended or adjusted under 35 U.S.C. 154(b) by 365 days.

(21) Appl. No.: 10/454,912

(22) Filed: Jun. 5, 2003

(65) Prior Publication Data

US 2004/0245301 A1   Dec. 9, 2004

(51) Int. Cl.
*B60R 7/00* (2006.01)
(52) U.S. Cl. ............... 224/275; 224/585; 348/837; D12/416
(58) Field of Classification Search ........... 224/275, 224/285, 576; 312/235.8, 223.2, 290, 213; 348/837, 844, 825; 100/107, 108, 111–117; 190/110, 112, 903; D12/415–425
See application file for complete search history.

(56) References Cited

U.S. PATENT DOCUMENTS

| 5,887,777 | A | * | 3/1999 | Myles et al. ............ 224/578 |
| 6,097,448 | A | * | 8/2000 | Perkins .................. 348/837 |
| D473,510 | S | * | 4/2003 | Denmeade ............... D12/416 |
| 6,659,319 | B2 | * | 12/2003 | Purpura .................. 224/576 |
| 2001/0011664 | A1 | * | 8/2001 | Meritt ..................... 224/275 |
| 2004/0112931 | A1 | * | 6/2004 | Swaim et al. ........... 224/585 |

* cited by examiner

*Primary Examiner*—Lien M. Ngo
(74) *Attorney, Agent, or Firm*—Ezra Sutton, Esq.

(57) ABSTRACT

A tote bag apparatus for securing a telecommunication device within a passenger vehicle between a pair of seats. The tote bag apparatus includes an inner bag having a generally rectangular shape, a partial rear panel, a front opening for receiving a telecommunication device, a top panel has one or more adjustable closure flaps for opening and closing the top panel for adjusting the size of the interior space of the inner bag; and an outer tote bag having a generally rectangular space, an outer rear panel and an outer top panel have an outer flap and a first outer flap opening for receiving the inner bag and telecommunication device within the outer bag interior space of the outer tote bag, an outer front panel has a front outer flap and a second outer flap opening for accessing the telecommunication device therein. The outer tote bag further includes a plurality of strap connecting buckles thereon for connecting detachable straps thereto, and a harness strapping system having a plurality of detachable straps for connecting one end of the detachable straps to the strap connecting buckles on the outer tote bag.

28 Claims, 15 Drawing Sheets

TELEVISION TOTE BAG

FIELD OF THE INVENTION

The present invention relates to a television tote bag for receiving a TV unit therein for use on a center armrest of a moving vehicle such as a car, van, sports utility vehicle (SUV), jeep, limousine and the like. More particularly, the television tote bag includes a plurality of detachable holding straps being attachable to each of the front seats and the center armrest in order to secure the TV unit and television tote bag to the center armrest of the passenger vehicle.

BACKGROUND OF THE INVENTION

Television viewing for backseat passengers traveling in moving vehicles has been found to be useful to a broad range of travelers from busy executives who maintain a chauffeured driven limousine to children and adults on family trips and vacation. Telecommunication transportation equipment and apparatus existing presently suffer from several problems with regard to ease and portability of use, as well as protection of the transported equipment such as a television monitor. These problems include deficiencies in equipment size, modularity, water resistant integrity, internal and external structural support, remote power supply capability, user and equipment access, storage capacity, and design compatibility with the vehicle and/or vehicle platform such as a center floor console, center armrest, etc., all of which are addressed and overcome by the present invention.

Therefore there remains a need for a removable television tote bag for receiving a TV unit therein for placement on a center armrest within a moving vehicle, as well as a harness strapping system for mounting of the television tote bag to the front seats and the center armrest of the passenger vehicle. Additionally, the television tote bag needs to be of a two part construction having an inner bag and outer bag fitted together for increased internal and external structural support for housing the TV unit therein.

DESCRIPTION OF PRIOR ART

Telecommunication transportation equipment, telecommunication transport apparatus and devices, television support devices having various designs, configurations, structures and materials of construction have been disclosed in the prior art. For example, U.S. Pat. No. 4,585,196 to CORMIER discloses a television support apparatus for use on an automobile front seat or center armrest utilized for rear seat viewing. The frame is generally U-shaped to fit over the back rest of the front seat or center armrest and is secured to the seat or center armrest by straps which are tightened around the seat or armrest. The portable television is secured to the frame by channel members which receive the base of the television and also by a strap which is tightened around the frame and television. This prior art patent does not teach or disclose the structure and design of the present invention of a television tote bag having outer and inner bags for supporting and receiving of a TV unit therein.

U.S. Pat. No. 5,725,189 to LANDY discloses an electronic device support apparatus including a wedge-shaped stand portion of light-weight material to support an electronic device. The support apparatus supports any type of electronic device, including a television set, a VCR, both a television and a VCR, any video monitor, a stereo, etc. The support apparatus is light-weight and portable and particularly suited to support an electronic device in an automobile. The apparatus includes a support strap coupled to the stand and adapted to surround the exterior of the electronic device. The support strap includes a closure means for retaining the support strap at a location adjacent to the exterior of the electronic device. This prior art patent does not teach or disclose the structure and design of the present invention of a television tote bag having outer and inner bags for supporting and receiving of a TV unit therein.

U.S. Pat. No. 6,092,705 to MERITT discloses a self-contained mounting system (a case) for housing, transporting and mounting video equipment (TV monitor, video player and the like) for use in passenger vehicles. The mounting system is releasably and securely mounted as an entertainment accessory within an automobile. The automobile has first and second headrests extending from at least one seat and an internal floor. The mounting system comprises a first case for receiving the entertainment accessory and a first quick connect device for releasably securing the first case to the internal floor and at least one of the first and second headrests. This prior art patent does not teach or disclose the structure and design of the present invention of a television tote bag having outer and inner bags for supporting and receiving of a TV unit therein.

U.S. Pat. No. 6,473,315 to DENMEADE discloses a telecommunications equipment transportation apparatus for remotely transporting telecommunications equipment for portable use, and in particular to an apparatus for transportation of such equipment for use away from the home or office. The telecommunications equipment transportation apparatus includes a base section, a container section and a harness system. The base provides a suspension which forms the supporting foundation for the unit and the equipment stored therein, and houses a power circuit that includes electrical outlet(s) for providing battery or generator-supplied alternating current (AC) or direct current (DC) power to the transported telecommunications equipment. This prior art patent does not teach or disclose the structure and design of the present invention of a television tote bag having outer and inner bags for supporting and receiving of a TV unit therein.

None of the aforementioned prior art patents teach or disclose the structure, design and configuration of the present invention of a television tote bag having outer and inner bags for supporting and receiving of a TV unit therein, as well as a harness strapping system for mounting of the television tote bag to the front seats and center armrest of a passenger vehicle.

Accordingly, it is an object of the present invention to provide a television tote bag that gives the user a unique and novel carrying and fastening system being especially designed for remotely transporting telecommunication equipment for portable use. In particular, the present invention provides for an apparatus for transport of such devices that include but are not limited to televisions (TVs), combined TV and DVD units, television video cassette recorder (VCR) units, computer monitors and equipment, video telephones, and DVD devices, etc. for use both separately or in combination with each other and with other peripheral and accessory equipment.

Another object of the present invention is to provide a television tote bag for the transport of portable telecommunications equipment for use away from the home or office.

Another object of the present invention is to provide a television tote bag being designed and constructed to protect, organize, fasten and strap the TV unit during transportation and use.

Another object of the present invention is to provide a television tote bag that is easily fastened and strapped to the front seats of a moving vehicle and firmly positioned and secured on the center armrest of the vehicle in order to minimize vibration for viewing the TV unit by passengers seated in the rear seats of the moving vehicle.

Another object of the present invention is to provide a television tote bag that can be designed and configured for use in moving vehicles such as automobiles, jeeps, minivans, vans, sport utility vehicles, recreational vehicles, campers, limos, boats, recreational aircraft and the like.

Another object of the present invention is to provide a television tote bag that enables the users to safely bring along such fragile telecommunication equipment (i.e. TV monitors) for use in a variety of remote settings.

Another object of the present invention is to provide a television tote bag that is of a two part construction having an inner bag and an outer bag fitted together for increased internal and external structural support for housing of the TV unit therein.

Another object of the present invention is to provide a television tote bag that incorporates a unique and improved construction and design in terms of size, modularity, materials, water resistant integrity, internal and external structural support, remote power supply capability, user and equipment access, storage capacity, and design compatibility with the transportation medium such as a vehicle and/or platform configuration of the vehicle in order to overcome the problems posed by the prior art.

A further object of the present invention is to provide a television tote bag that is capable of withstanding everyday wear and tear, as well as being secure, safe, efficient, durable and easy to use.

A still further object of the present invention is to provide a television tote bag that can be mass produced in an automated and economical manner and is readily affordable by the consumer.

SUMMARY OF THE INVENTION

In accordance with the present invention, there is provided a tote bag apparatus for securing a telecommunication device within a passenger vehicle between a pair of seats. The tote bag apparatus includes an inner bag having a partial rear panel, a top panel, a bottom panel and a pair of side panels for forming an interior space having a generally rectangular shape. The inner bag also has a front opening for receiving a telecommunication device within the interior space of the inner bag. The top panel has one or more adjustable closure flaps for opening and closing the top panel for adjusting the size of the interior space of the inner bag, for receiving and holding different sizes of a telecommunication device therein. The tote bag apparatus further includes an outer tote bag having an outer front panel, an outer rear panel, an outer top panel, an outer bottom panel, an outer side panels for forming an outer bag interior space having a generally rectangular space. The outer rear panel and the outer top panel have an outer flap and a first outer flap opening for receiving the inner bag and telecommunication device within the outer bag interior space of the outer tote bag. Further, the outer front panel has a front outer flap and a second outer flap opening for accessing the telecommunication device therein. The outer tote bag further includes a plurality of strap connecting buckles thereon for connecting detachable straps thereto. Additionally, the tote bag apparatus includes a harness strapping system having a plurality of detachable straps for connecting one end of the detachable straps to the strap connecting buckles on the outer tote bag. Each of the detachable straps are removably attached at their other ends to the strap connecting buckles on the outer tote bag.

BRIEF DESCRIPTION OF DRAWINGS

Further objects, features, and advantages of the present invention will become apparent upon the consideration of the following detailed description of the presently-preferred embodiment when taken in conjunction with the accompanying drawings, wherein.

DETAILED DESCRIPTION OF THE PREFERRED EMBODIMENT

Figure 1:
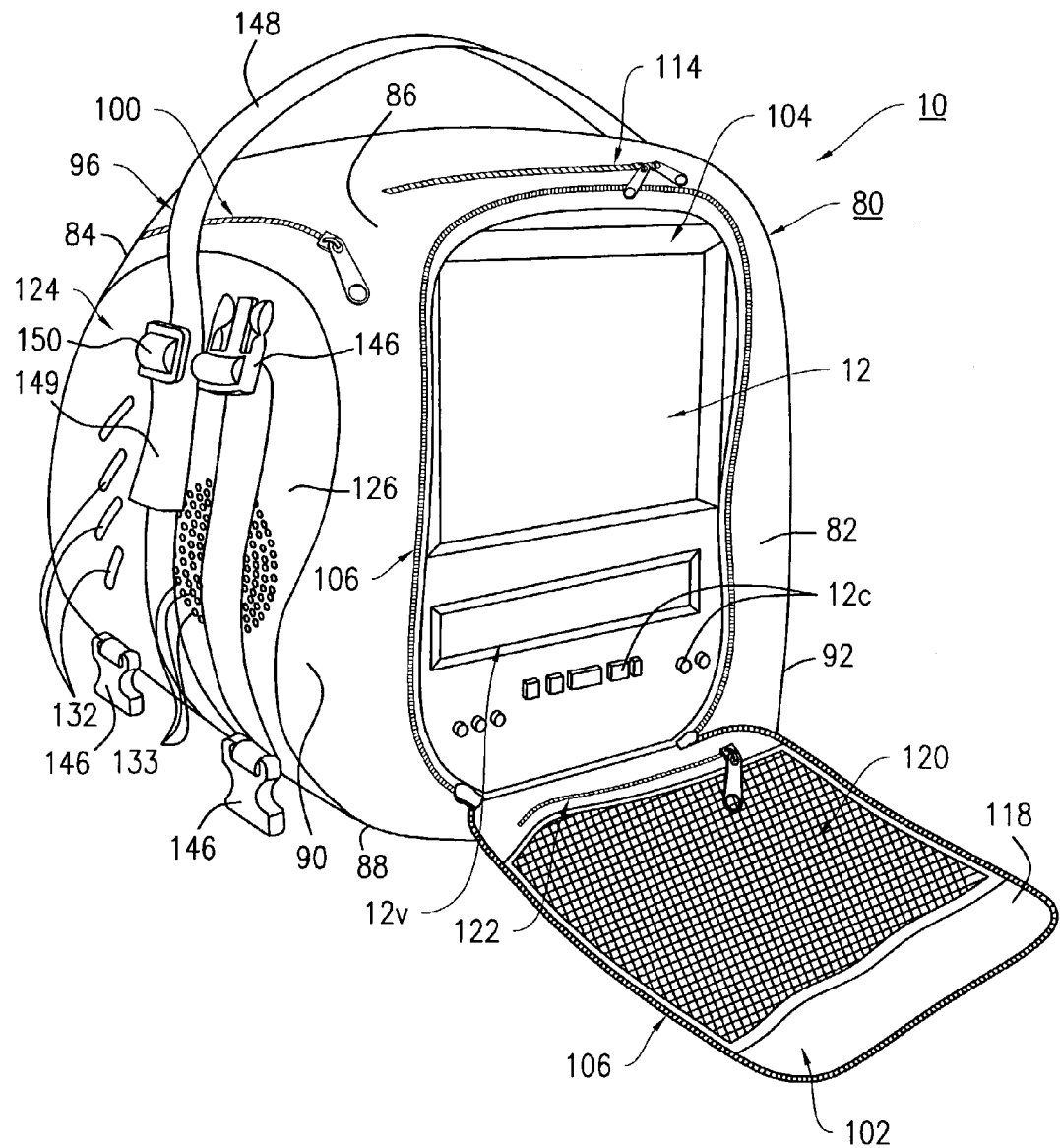
FIG. 1 is a front perspective view of the television tote bag of the preferred embodiment of the present invention showing the television tote bag having a TV unit therein in an assembled state being readied for operational use thereof.
Figure 2:
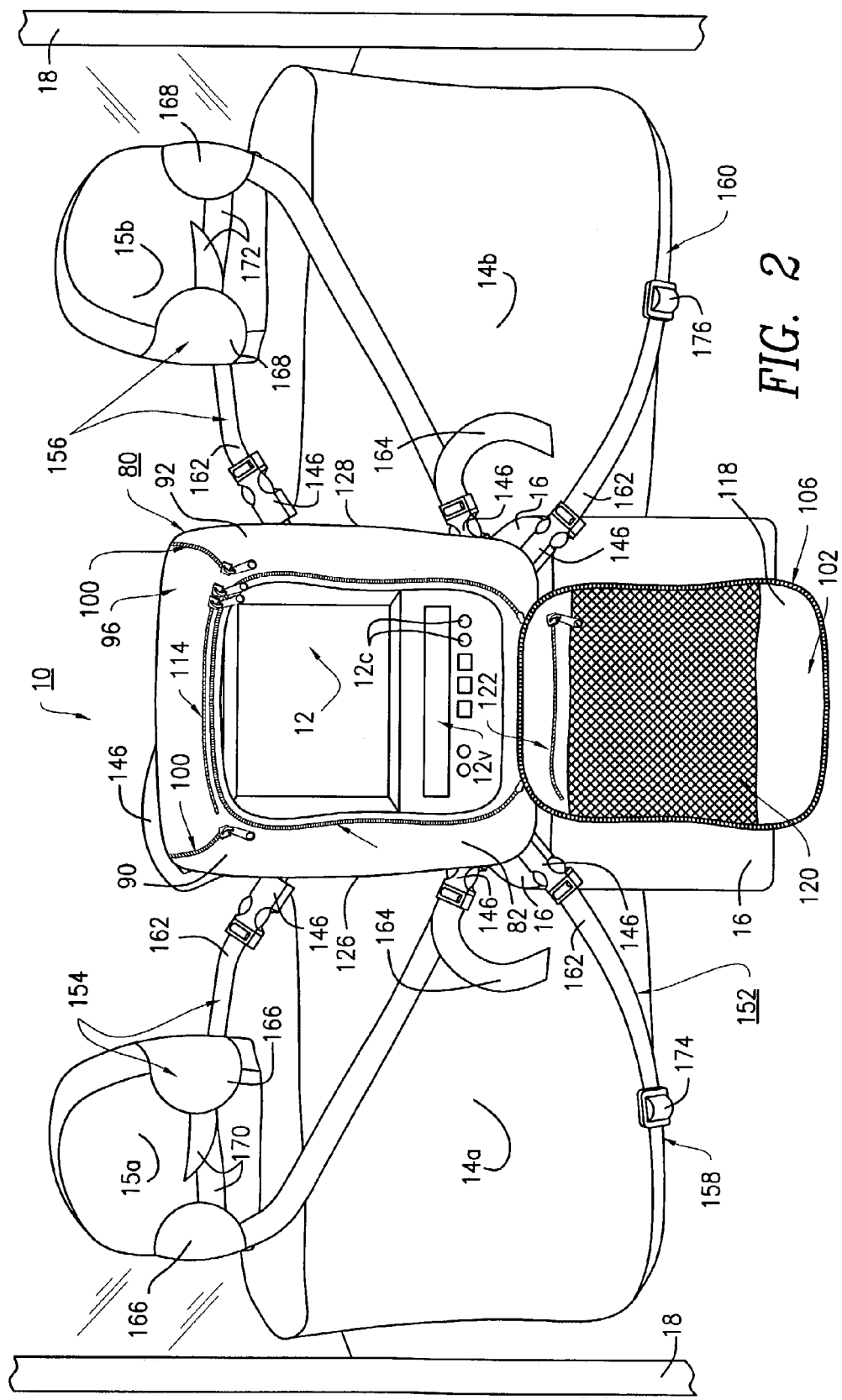
FIG. 2 is a front perspective view of the television tote bag of the preferred embodiment of the present invention showing the television tote bag having the TV unit therein in an assembled state and in operational use thereof.
Figure 3:
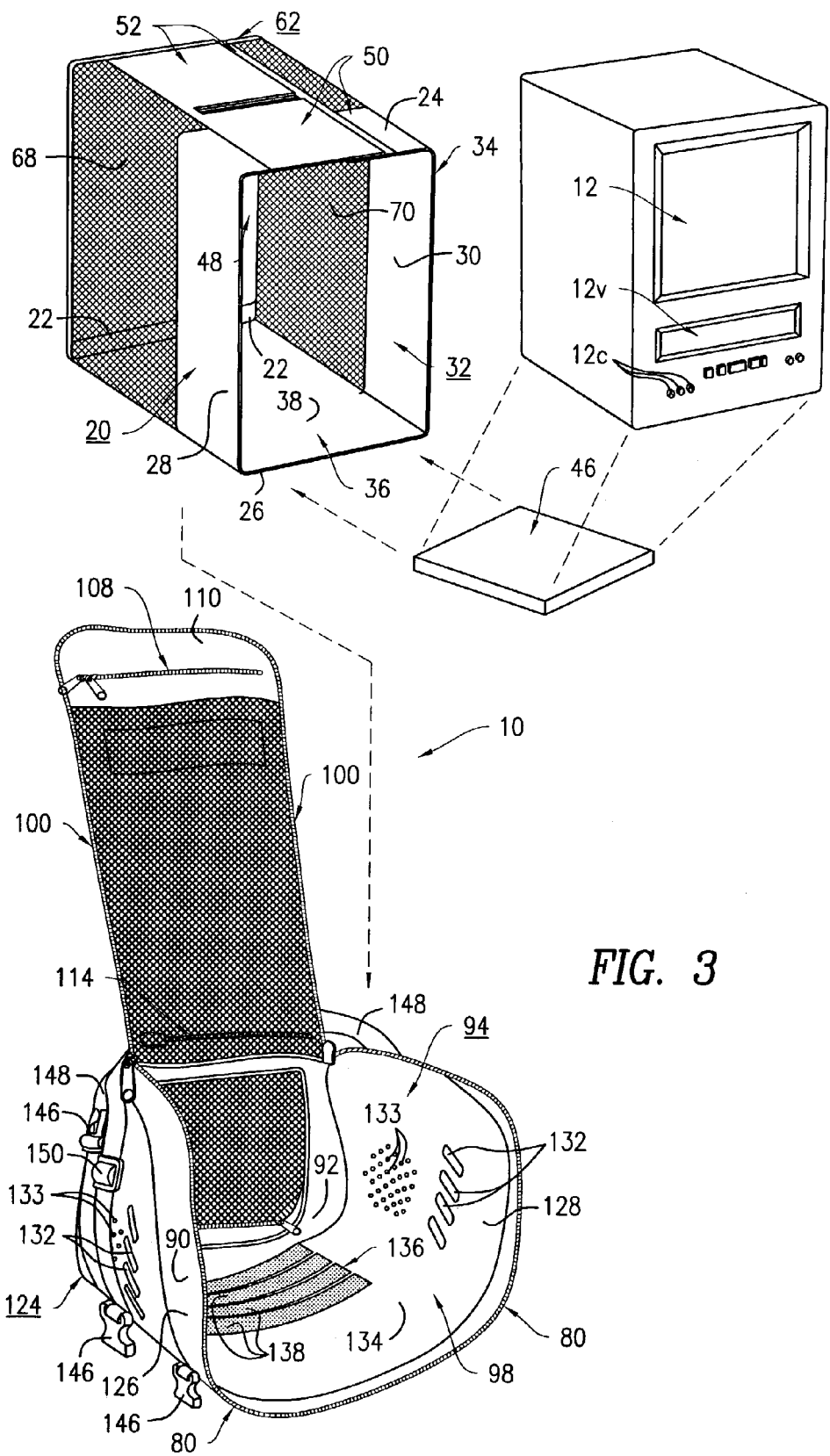
FIG. 3 is an exploded perspective view of the television tote bag of the present invention showing the TV unit being received within an inner bag, and the inner bag and TV unit being received within an outer tote bag.

A television (TV) tote bag apparatus 10 for holding a portable TV unit 12 and VCR tape deck 12v combination or other telecommunication devices therein and for attaching the TV tote bag apparatus 10 to front seats 14a and 14b, headrests 15a and 15b and a center armrest 16 of a passenger vehicle 18 for viewing by passengers in rear seats (not shown) is represented in detail by FIGS. 1 to 17b of the patent drawings. As shown in FIGS. 1 through 3, the TV tote bag apparatus 10 includes a detachable inner bag 20, an outer tote bag 80, and a harness system 152 for attaching and holding the TV tote bag apparatus 10 to the front seats 14a and 14b and the center armrest 16 of the passenger vehicle 18 in order for the rear seated passenger(s) (not shown) to view the TV unit 12 in the passenger vehicle 18 while the vehicle 18 is in a stationary, parked or moving condition.

Figure 4:
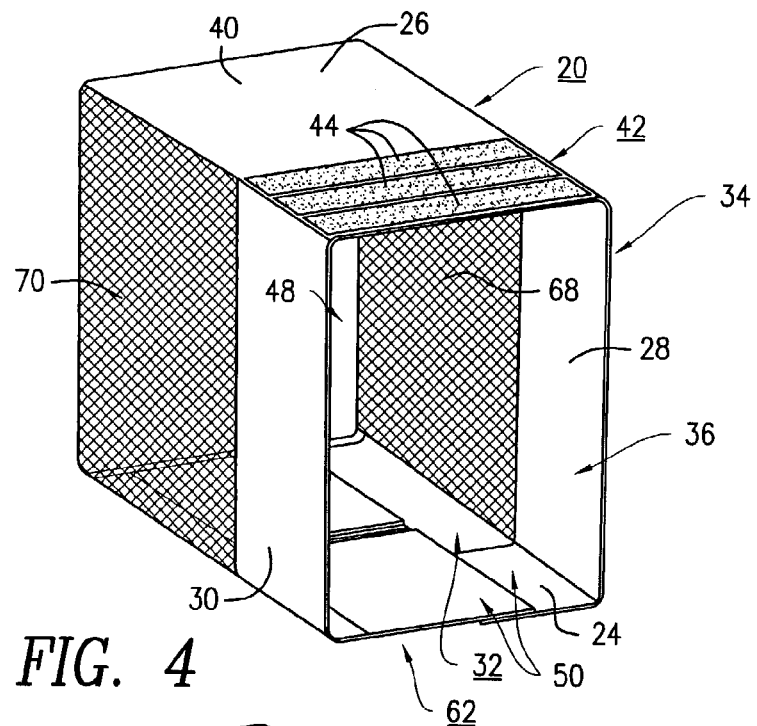
FIG. 4 is a bottom perspective view of the television tote bag of the present invention showing a plurality of loop fastener strips on an outer wall surface of a bottom panel of the inner bag.
Figure 5:
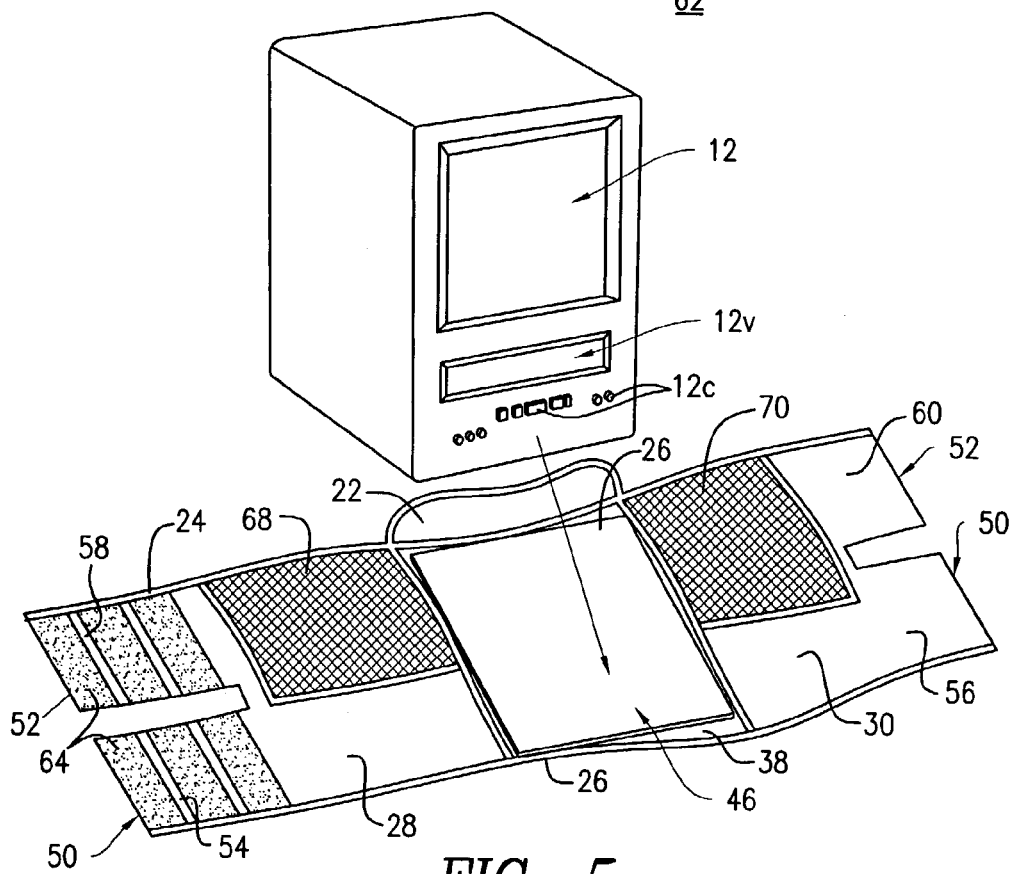
FIG. 5 is an exploded perspective view of the television tote bag of the present invention showing the TV unit being placed upon a base stiffner member within the inner bag for closure with a pair of closure flaps.
Figure 6:
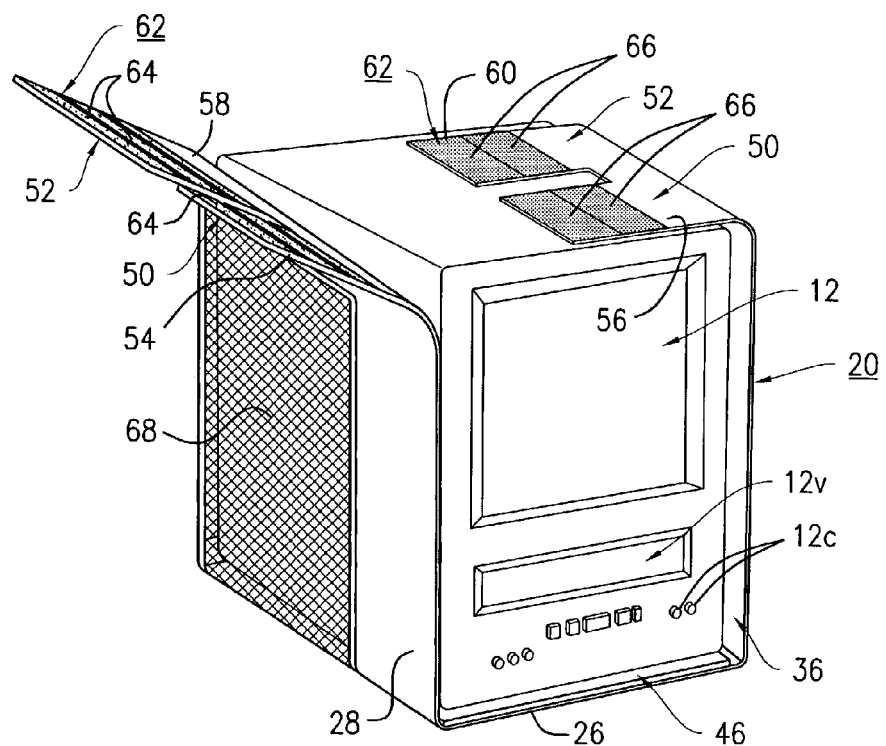
FIG. 6 is a perspective view of the television tote bag of the present invention showing the TV unit within an interior space of the inner bag with its closure flaps in an opened position being readied for closure of a top panel of the inner bag.
Figure 7:
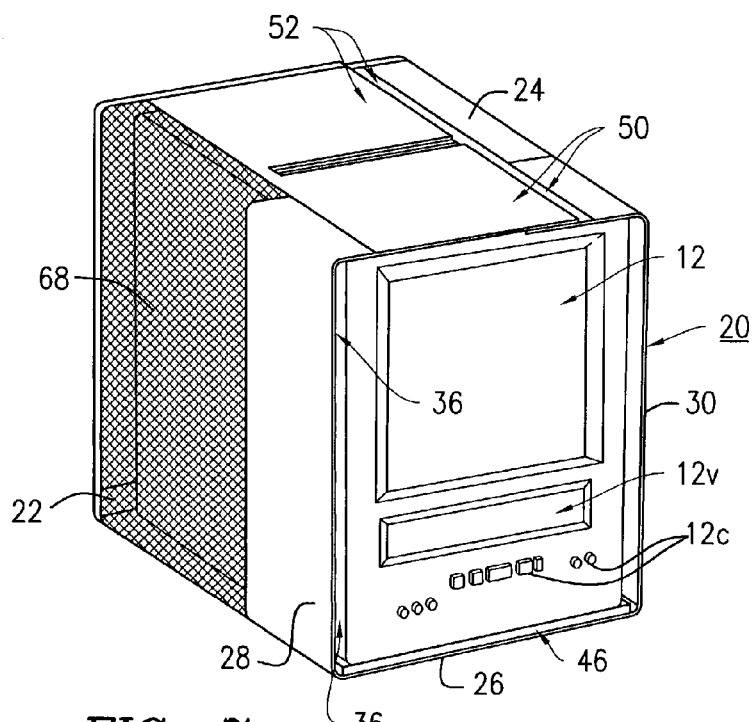
FIG. 7 is a perspective view of the television tote bag of the present invention showing the TV unit within the interior space of the inner bag with its closure flaps in a closed position.

The detachable inner bag 20, as depicted in FIGS. 3, 4 and 6, includes a partial rear inner panel 22, a top inner panel 24, a bottom inner panel 26 and a pair of side inner panels 28 and 30 for forming an interior space 32 having a generally rectangular shape 34. All of the inner panels 22 to 30 are integrally connected to each other to form the detachable inner bag 20. The inner bag 20, as shown in FIGS. 3 and 4, includes a front opening 36 for accessing the controls 12c of the TV unit 12 or other telecommunication devices within the interior space 32 of the inner bag 20. The bottom inner panel 26 includes an inner wall surface 38 and an outer wall surface 40 having first attachment device 42 thereon. The first attachment device 42 includes a plurality of loop fastener strips 44 on the outer wall surface 40 of the bottom inner panel 26, as depicted in FIG. 4 of the drawings. The inner wall surface 38 of the bottom inner panel 26 of inner bag 20 detachably receives a base stiffner member 46 within the interior space 32 of inner bag 20 for supporting the TV unit 12 or other telecommunication devices thereon, as shown in FIGS. 3 and 5 of the drawings. The partial rear inner panel 22, as depicted in FIGS. 3 and 4, includes a window opening 48 for accessing controls (not shown) on the rear side of the TV unit 12 or other telecommunication devices. The top inner panel 24, as depicted in FIGS. 3, 4 and 7, includes a pair of adjustable closure flaps 50 and 52 for opening and closing the top inner panel 24 for adjusting the size of the interior space 32 of the inner bag 20. Each of the closure flaps 50 and 52 includes upper flap elements 54 and 58, and lower flap elements 56 and 60, respectively. Each of the upper and lower flap elements 54 and 56, and 58 and 60 of the adjustable closure flaps 50 and 52, respectively, include closure means 62 in the form of the hook and loop fastener strips 64 and 66, respectively, as shown in FIGS. 5 and 6 of the drawings. Each of the side inner panels 28 and 30 include mesh webbing members 68 and 70, respectively, which allows the venting of excessive heat when the TV unit 12 and other telecommunication devices are in an operational mode. The adjustable closure flaps 50 and 52 on top inner panel 24 allows interior space 32 to receive and hold different sizes of TV units or other telecommunication devices within the interior space 32 of inner bag 20. The inner bag 20 is made from flexible materials such as canvas, polyesters, nylons, cotton, mesh and combinations thereof.

Figure 8:
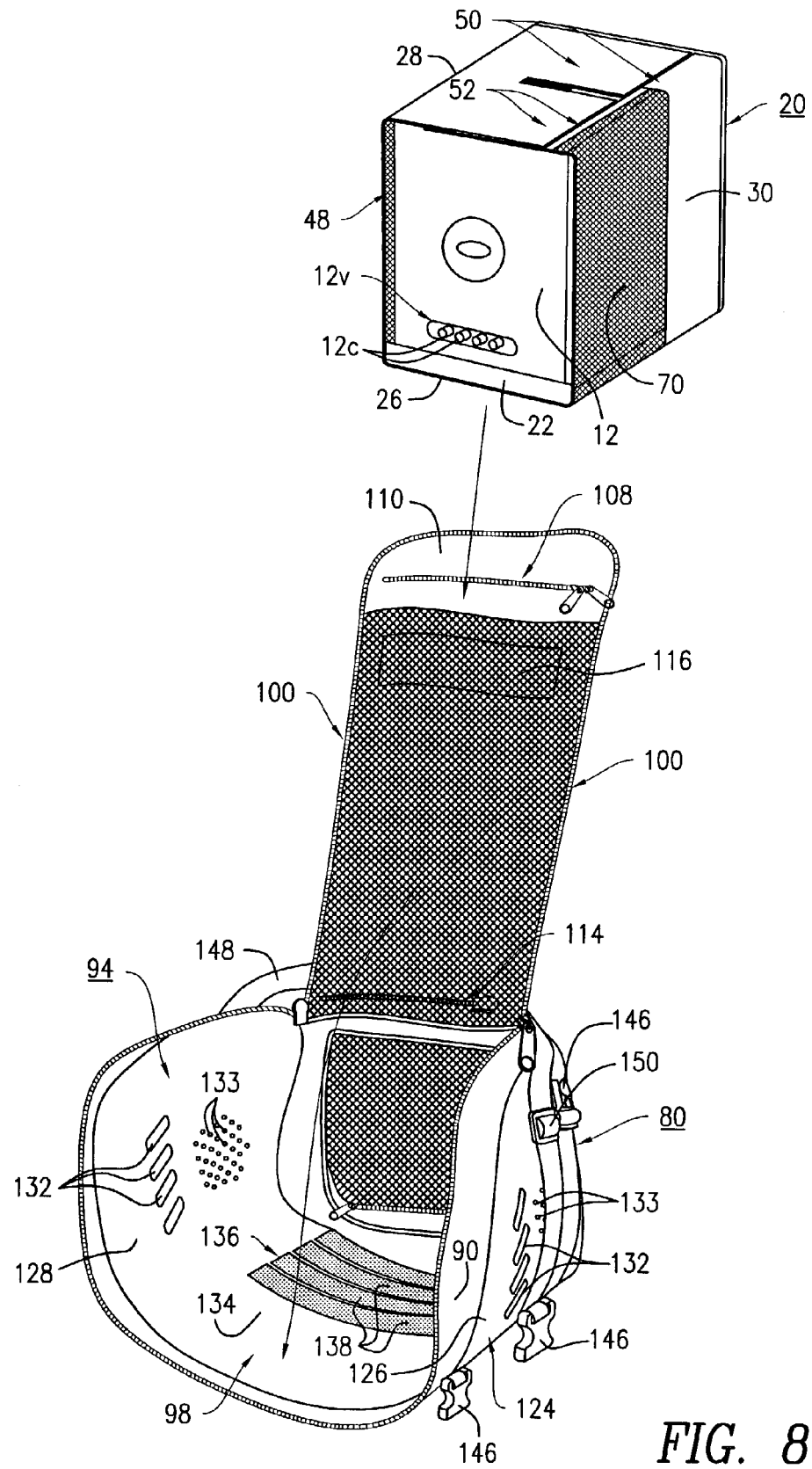
FIG. 8 is a perspective view of the television tote bag of the present invention showing the TV unit within the inner bag being placed through a first outer flap opening of an outer flap of the outer tote bag.
Figure 9:
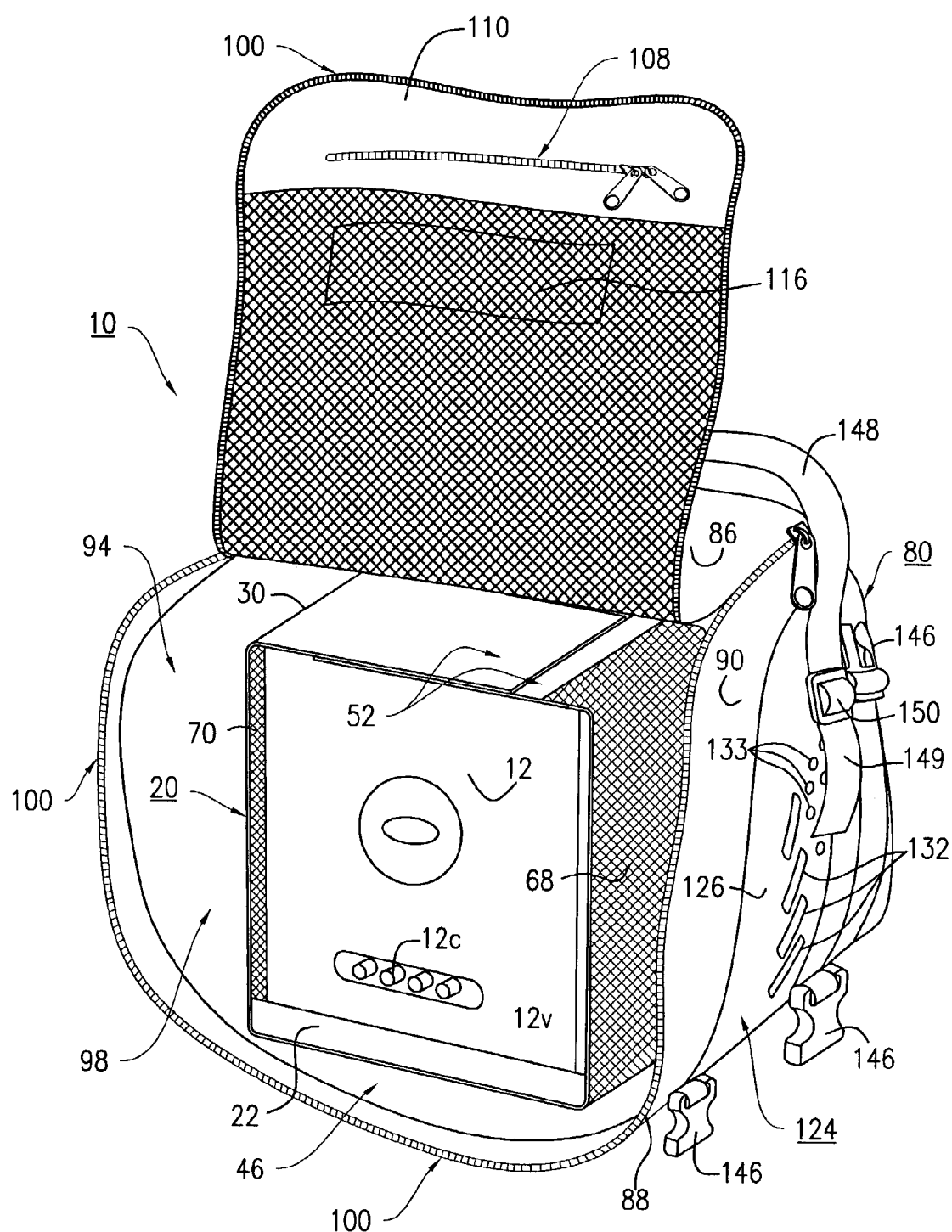
FIG. 9 is a rear perspective view of the television tote bag of the present invention showing the inner bag within the outer tote bag in an assembled state with the TV unit therein having the outer flap in an opened position being readied for closure of the rear and top outer panels.
Figure 12:
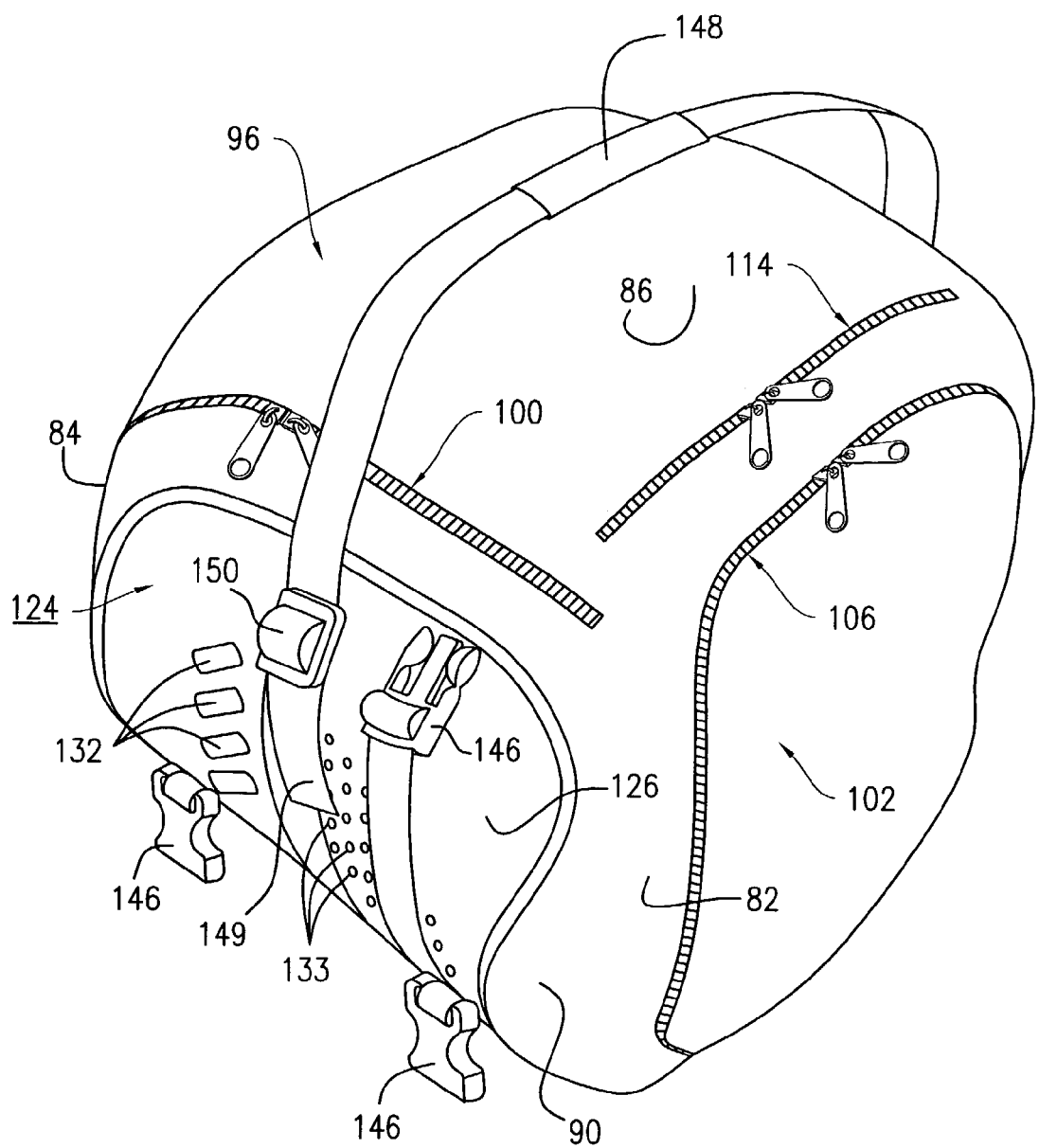
FIG. 12 is a top perspective view of the television tote bag of the present invention showing the outer tote bag having the outer front flap and the outer flap in the closed position.

The outer tote bag 80, as depicted in FIGS. 3, 8, 10, 11 and 13, includes an outer front panel 82, an outer rear panel 84, an outer top panel 86, an outer bottom panel 88 and a pair of outer side panels 90 and 92 for forming an outer bag interior space 94 having a generally rectangular shape. All of the outer panels 82 to 92 are integrally connected to each other to form the outer tote bag 80. As shown in FIGS. 1, 3 and 8 of the drawings, the outer rear panel 84 and the outer top panel 86 include an outer flap 96 having a first outer flap opening 98. The outer rear panel 84 and the outer top panel 86 in conjunction with the outer flap 96 include a first outer zipper member 100 for opening and closing the first outer flap opening 98 on the outer rear and outer top panels 84 and 86 of the outer tote bag 80, as shown in FIGS. 3 and 9 of the drawings. The first outer flap opening 98 is used for receiving the inner bag 20 and the TV unit 12 within the outer bag interior space 94 of the outer tote bag 80. The outer front panel 82 includes a front outer flap 102 having a second outer flap opening 104. The outer front panel 82 in conjunction with the front outer flap 102 include a second outer zipper member 106 for opening and closing the second outer flap opening 104 on the outer front panel 82 of the outer tote bag 80, as depicted in FIGS. 8, 9 and 12 of the drawings. The second outer flap opening 104 is used for accessing the controls 12c on the front side of the TV unit 12 and VCR tape deck 12v, as shown in FIGS. 1 and 3 of the drawings.

Additionally, the outer flap 96 includes a third outer zipper member 108 being adjacent to the outer rear panel 84 of the outer tote bag 80, as shown in FIGS. 8 and 9 of the drawings. The third outer zipper member 108 is used for accessing the controls on the rear side of the TV unit 12 and/or the VCR tape deck 12v. The outer flap 96 also includes an inner wall surface 110 having a first pocket-type compartment 112 with a first inner zipper member 114 thereon. The first pocket-type compartment 112 is used for the storing of telecommunication accessories such as a TV remote control clicker, a removable extension cord and plug, head phones and the like. The outer flap 96 further includes a rear mesh window 116 for viewing the rear side of the TV unit 12 and/or the VCR tape deck 12v, as shown in FIGS. 8 and 12 of the drawings. The front outer flap 102 includes an inner wall surface 118 having a second pocket-type compartment 120 with a second inner zipper member 122 thereon. The second pocket-type compartment 120 is also used for the storing of smaller sized telecommunication accessories as previously mentioned.

Figure 10:
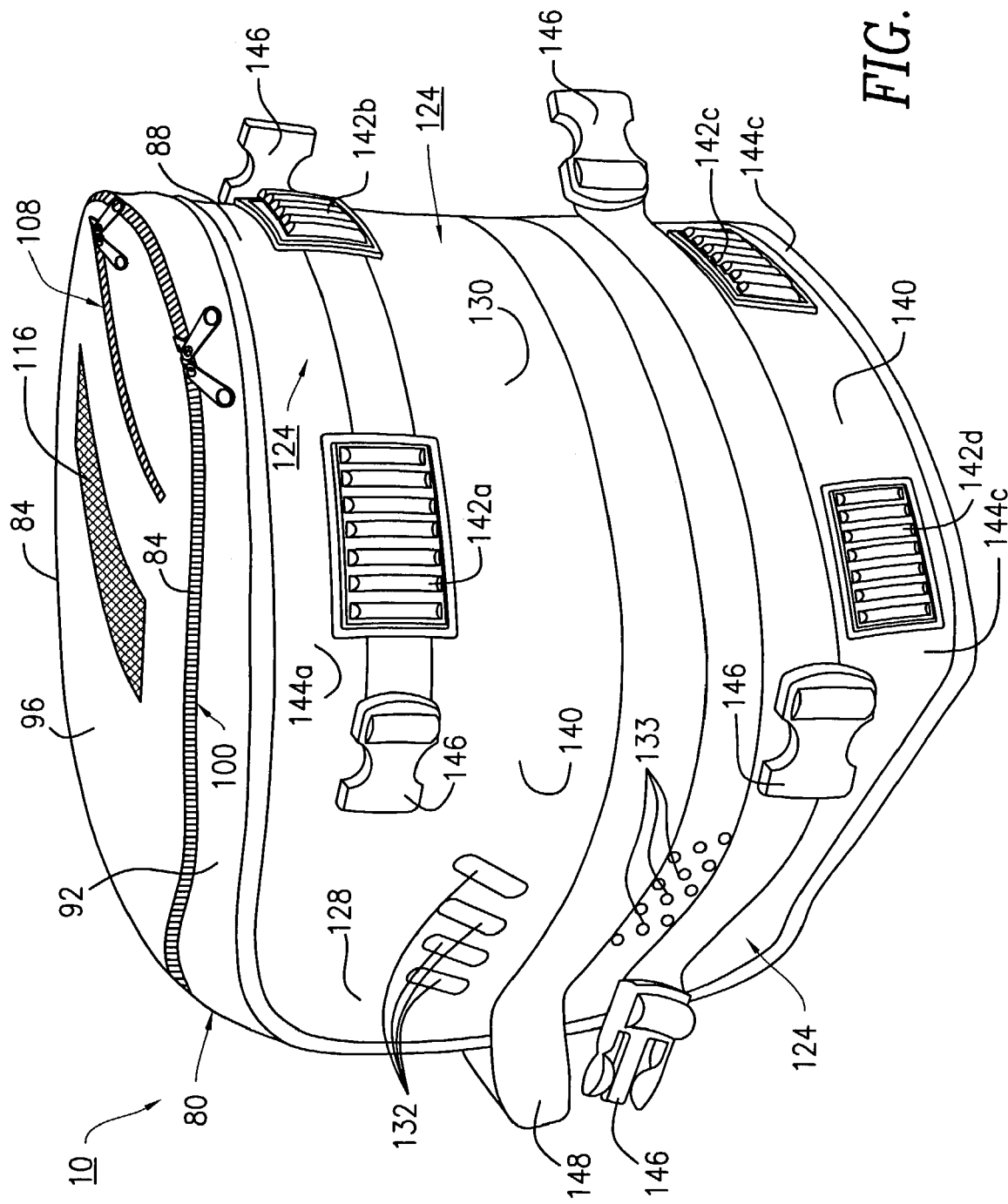
FIG. 10 is a bottom perspective view of the television tote bag of the present invention showing a plurality of strap connecting buckles attached to an outer side panel of the outer tote bag.
Figure 11:
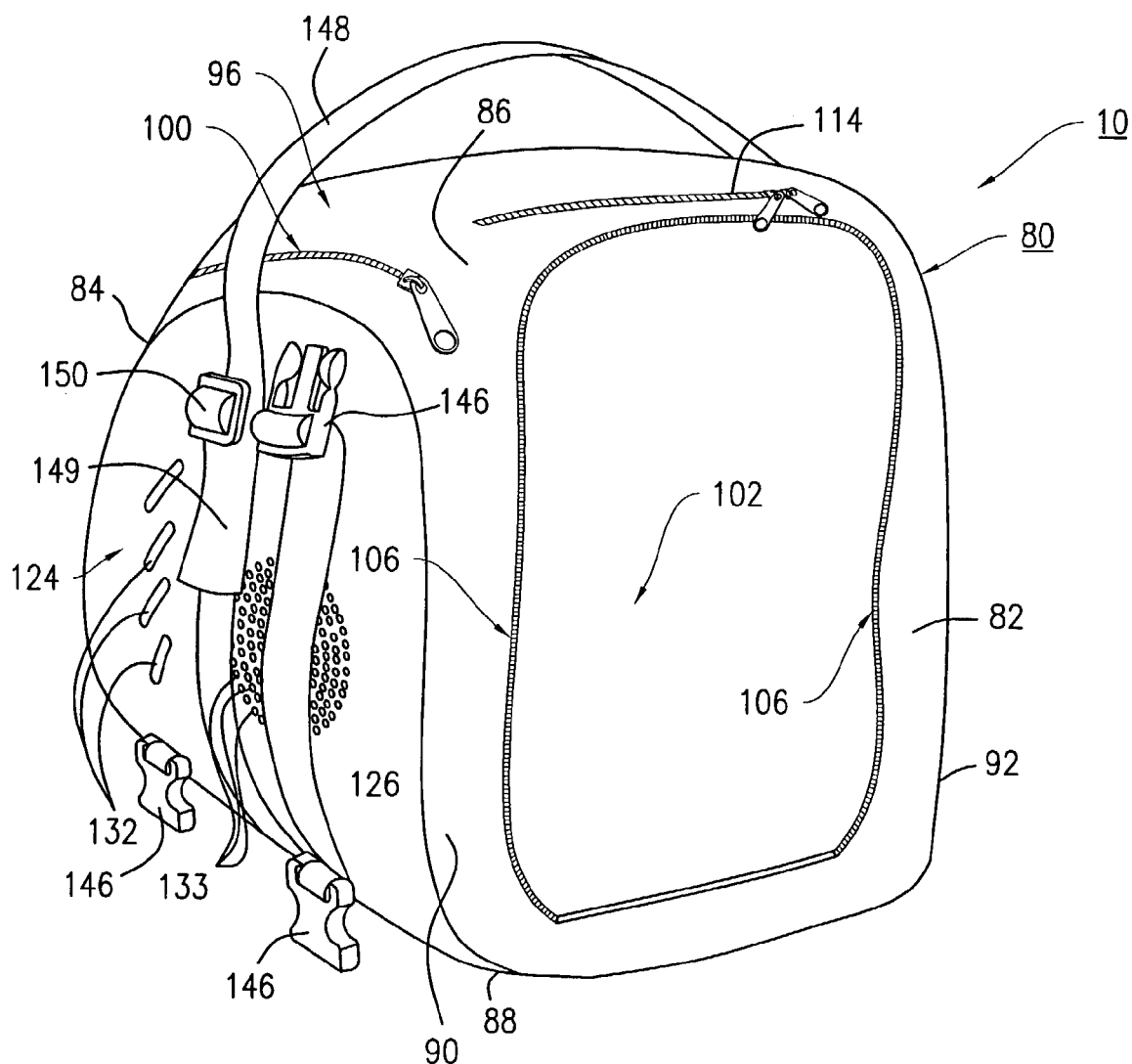
FIG. 11 is a front perspective view of the television tote bag of the present invention showing the outer tote bag with an outer front flap in the closed position.
Figure 13:
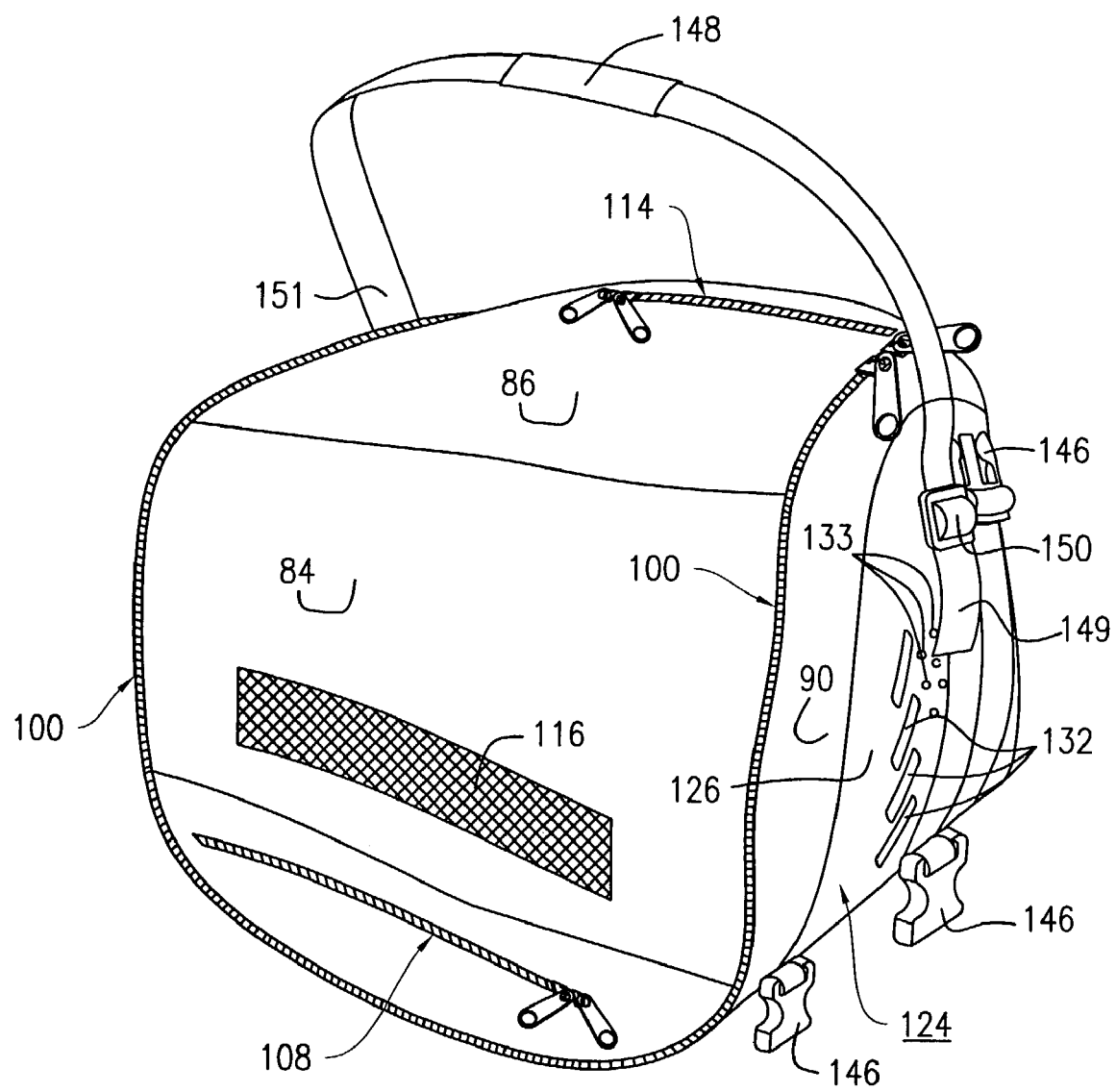
FIG. 13 is a rear perspective view of the television tote bag of the present invention showing the outer tote bag with an outer flap in the closed position.

The outer tote bag 80 further includes a reinforcing external structural support member 124 being attached to the outer side panels 90 and 92 and to the outer bottom panel 88 having a substantially U-shape configuration. The external structural support member 124 is used for supporting and holding of the TV unit 12 and the inner bag 20 within the outer bag interior space 94 of the outer tote bag 80, as shown in FIGS. 3 and 8 of the drawings. The external structural support member 124 is a single constructed unit being made from a moldable and flexible plastic material. The external structural support member 124 includes a pair of side sections 126 and 128 and a bottom section 130. Each of the side sections 126 and 128 of the external structural support member 124 include a plurality of venting openings 132 for venting of heat from the TV unit 12 during its operational use, as well as a plurality of circular openings 133 for receiving sound from the TV unit 12. The bottom section 130 of the external structural support member 124 includes an inner wall surface 134 having a second attachment device 136 thereon. The second attachment device 136 includes a plurality of hook fastener strips 138 on the inner wall surface 134 of bottom section 130 of the external structural support member 124, as depicted in FIG. 3 of the drawings. The plurality of hook fastener strips 138 on the inner wall surface 134 of the bottom section 130 of the external structural support member 124 is adjacent to the second outer flap opening 104 of front outer flap 102 of the outer tote bag 80. The bottom section 130 of the external structural support member 124 also includes an outer wall surface 140 having four spaced-apart gripping feet 142a, 142b, 142c, and 142d being attached to corners 144a, 144b, 144c, and 144d of the outer wall surface 140 of bottom section 130, respectively, as shown in FIG. 10 of the drawings. Each of the side sections 126 and 128 of the external structural support member 124 further include a plurality of spaced-apart strap connecting buckles 146 connected to each of the side sections 126 and 128, respectively, as depicted in FIGS. 10 and 13 of the drawings. The outer tote bag 80 further includes a carrying strap member 148 having a first end 149 and a second end 151. The first end 149 of carrying strap member 148 is connected to the side section 126 and the second end 151 of carrying strap member 148 is connected to the side section 128, respectively, of the external structural support member 124, as shown in FIGS. 1 and 2 of the drawings. The first end 149 of carrying strap member 148 further includes a strap adjustment buckle 150 for adjusting the length of the carrying strap member 148 at its first end 149, as depicted in FIG. 1. The carrying strap member 148 is used for carrying of the tote bag apparatus 10 and the TV unit 12 to and from the passenger vehicle 18, as shown in FIG. 1 of the drawings. The outer tote bag 80 is made from flexible materials such as canvas, polyester, nylons, cotton, mesh and combinations thereof.

Figure 14:
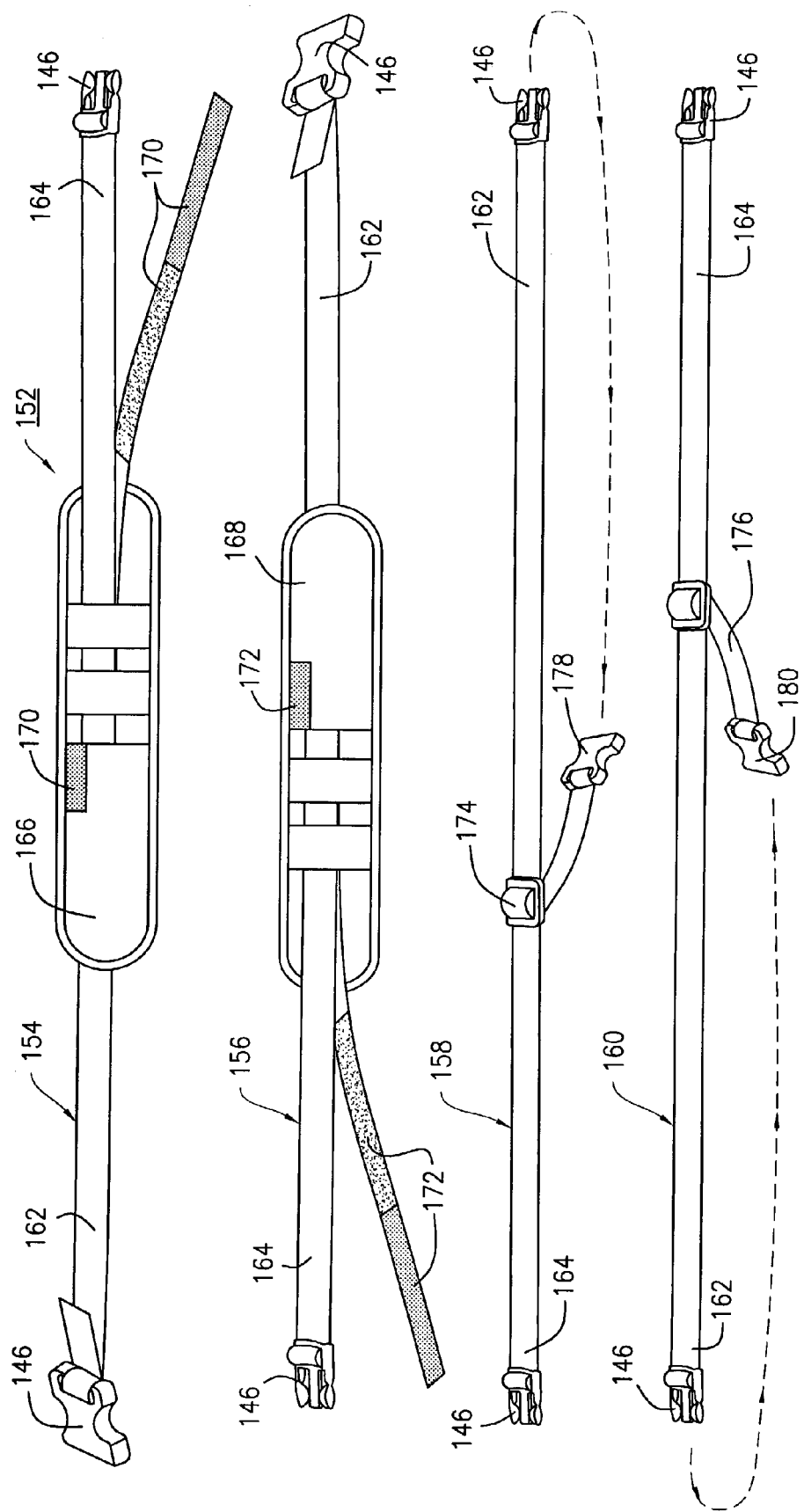
FIG. 14 is a front plain view of the television tote bag of the present invention showing a harness system having a plurality of holding straps thereof being readied in preparation for attachment to the front seats of a passenger vehicle.
Figure 15:
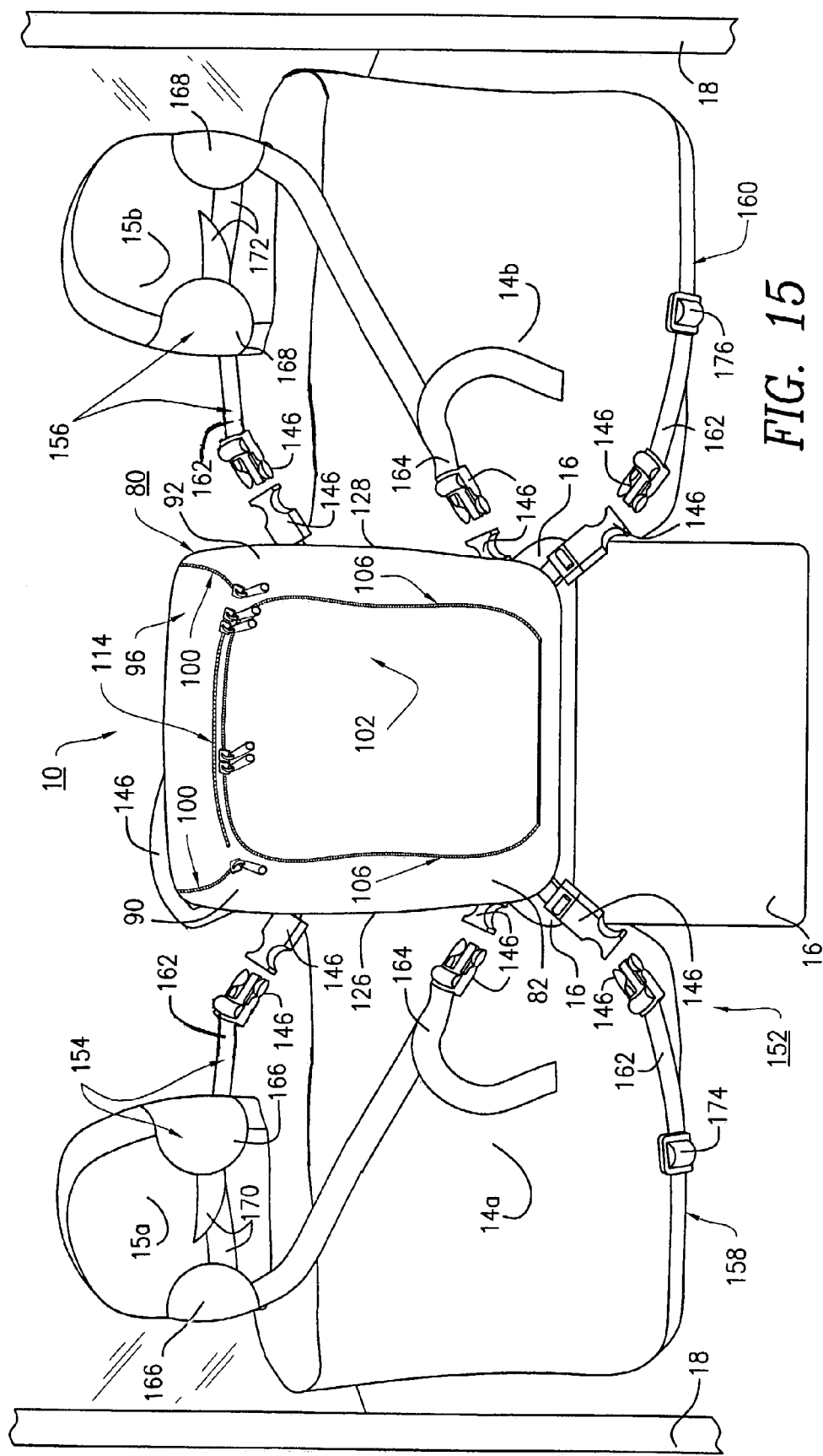
FIG. 15 is a perspective view of the television tote bag of the present invention showing a pair of harness detachable straps and a pair of detachable attachment straps for attaching and holding to the headrests and front seats of a passenger vehicle in preparation for attaching to the outer tote bag.
Figure 16A:
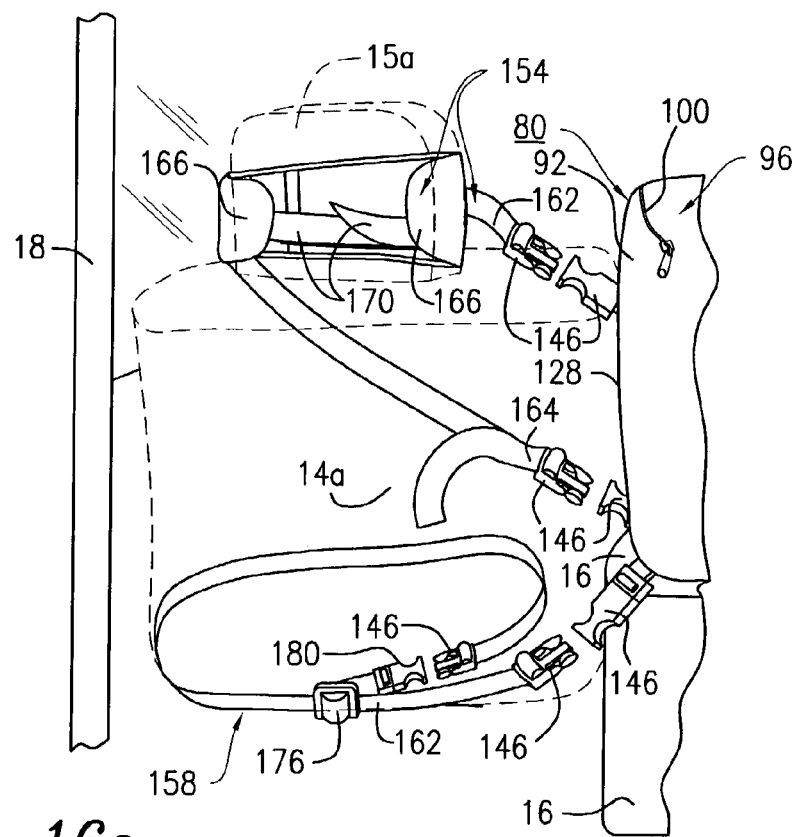
FIG. 16a is a perspective view of the television tote bag of the present invention showing the harness detachable strap and the detachable attachment strap for attaching and holding to the driver's headrest and driver's front seat of the passenger vehicle being readied to attach to the outer tote bag.
Figure 16B:
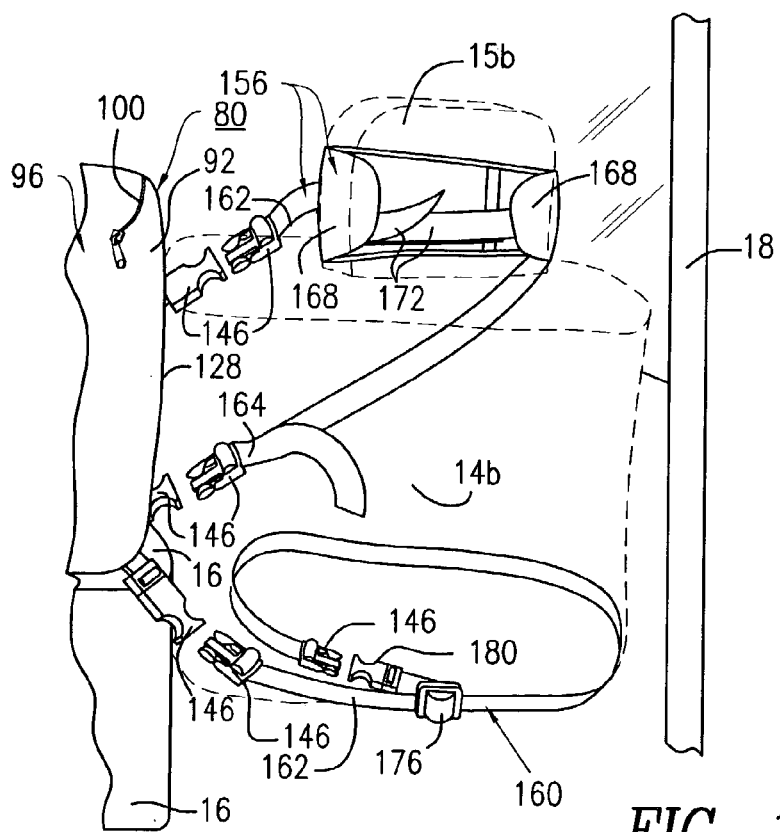
FIG. 16b is a perspective view of the television tote bag of the present invention showing the harness detachable strap and the detachable attachment straps for attaching and holding to the passenger's headrest and passenger's front seat of the passenger vehicle being readied to attach to the outer tote bag.
Figure 17A:
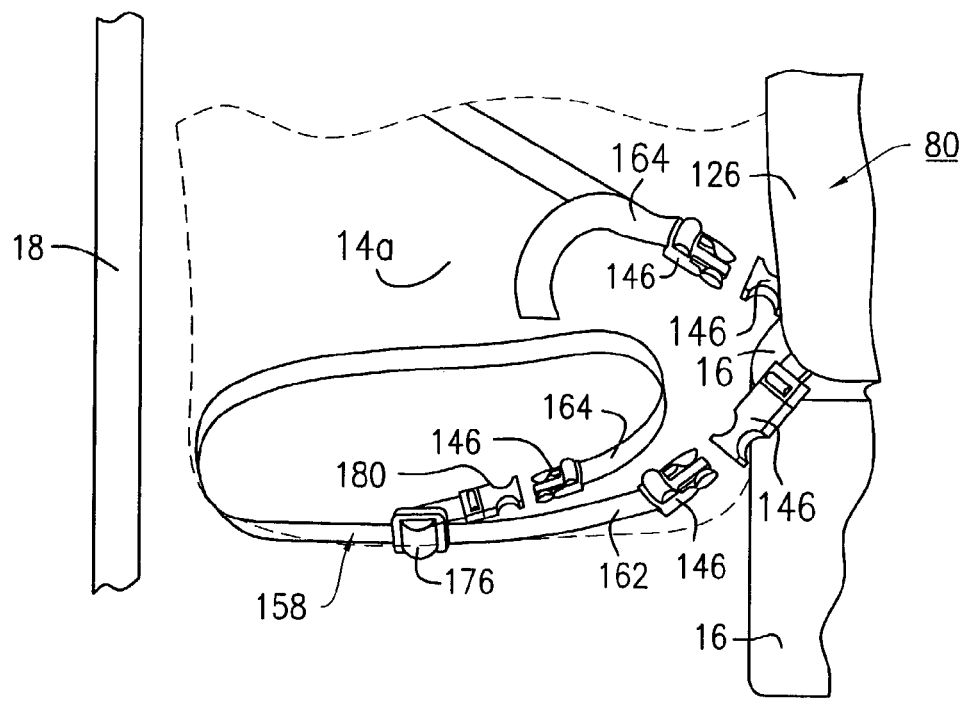
FIG. 17a is a perspective view of the television tote bag of the present invention showing the detachable attachment strap for attaching and holding to the driver's front seat of the passenger vehicle being readied to attach to the outer tote bag.
Figure 17B:
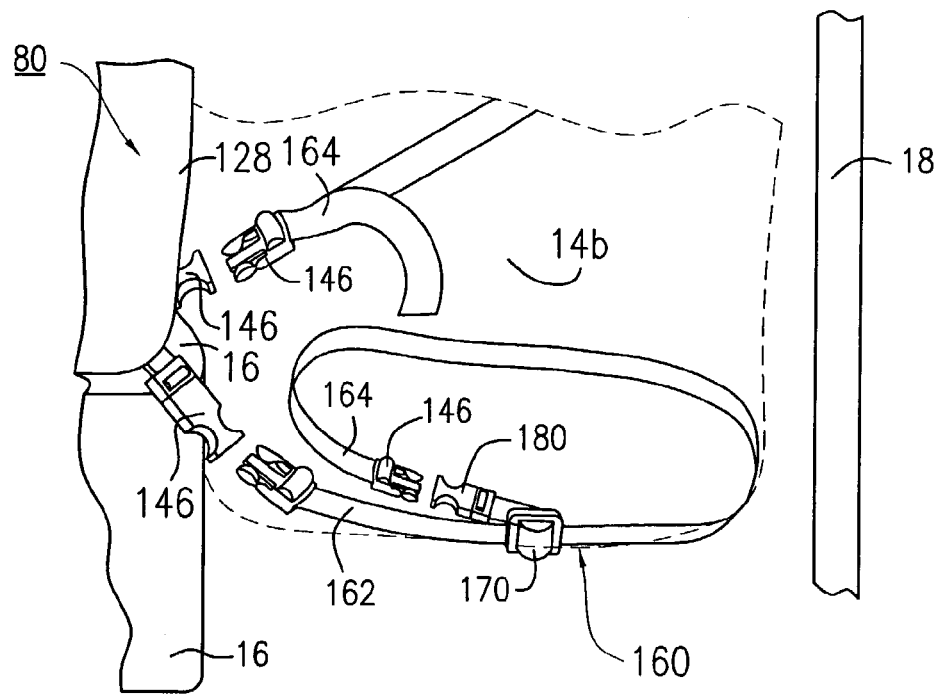
FIG. 17b is a perspective view of the television tote bag of the present invention showing the detachable attachment strap for attaching and holding to the passenger's front seat of the passenger vehicle being readied to attach to the outer tote bag.

The outer tote bag 80, as shown in FIGS. 2, 14 and 15, also includes a harness strapping system 152 having a plurality of detachable straps 154, 156, 158 and 160 for connecting a portion of the detachable straps 154, 156, 158, and 160 to the front seats 14a and 14b, and/or headrests 15a and 15b and center armrest 16 of the passenger vehicle 18, in order to secure and hold the TV unit 12 and the tote bag apparatus 10 in place between the front seats 14a and 14b of the passenger vehicle 18. Each of the detachable straps 154 to 160 is removably attached at each of their ends 162 and 164 to the strap connecting buckles 146 on the side sections 126 and 128 of the external structural support member 124, as shown in FIGS. 2 and 14 to 17b of the drawings. In particular, the first harness detachable strap 154 is used for attaching and securing to the front driver's seat 14a and headrest 15a, and the second harness detachable strap 156 is used for attaching to the front passenger's seat 14b and headrest 15b and the third and fourth detachable attachment straps 158 and 160 are used for attaching and holding to the center armrest 16 of the passenger vehicle 18, as shown in FIGS. 2 and 14 to 17b of the drawings. Additionally, each of the harness detachable straps 154 and 156 further include a headrest attachment section 166 and 168 each having a hook and loop strip 170 and 172 for wrapping around the headrests 15a and 15b of the driver's and passenger's seats 14a and 14b, respectively, as shown in FIGS. 2, 15 to 17b of the drawings. Each of the ends 162 and 164 of the harness detachable straps 154 and 156 are attached to the strap connecting buckles 146 on the side sections 126 and 128 of the outer tote bag 80. Also, each of the detachable attachment straps 158 and 160 include an adjustment strap buckle 174 and 176 and a connection buckle 178 and 180 for connecting one end 162 of the straps 158 and 160 thereto. The adjustment strap buckles 174 and 176 are used for adjusting the length of the detachable attachment straps 158 and 160, respectively, in order to secure and hold the outer tote bag 80 to the center armrest 16 of the passenger vehicle 18. The other end 164 of the detachable attachment straps are connected to the strap connecting buckles 146 on the side sections 126 and 128 of the outer tote bag, as shown in FIGS. 2 and 15 of the drawings.

OPERATION OF THE PRESENT INVENTION

In operating the tote bag apparatus 10 of the present invention the user proceeds in the following manner. The user initially lays-out the detachable inner bag 20 such that the bottom inner panel 26, the side inner panels 28 and 30 and the flap elements 54, 56, 58 and 60 of closure flaps 50 and 52 are laid flat (F), as shown in FIG. 5 of the drawings. The user then places the base stiffner member 46 on the inner wall surface 38 of the bottom inner panel 26 of inner bag 20, such that TV unit 12 may be placed on top of the base stiffner member 46. Next, the user pulls each of the side inner panels 28 and 30 in an upward manner, where then the user closes the upper and lower flap elements 54, 58 and 56 and 60 using the hook and loop fastener strips 64 and 66 thereon to close the closure straps 50 and 52 on the TV unit 12, adjusted to its size, as shown in FIGS. 5 and 6 of the drawings. The next step has the user placing the inner bag 20 with TV unit 12 therein into the first outer flap opening 98, where then the inner bag 20 with TV unit 12 is inserted and placed within the outer bag interior space 94 of the outer tote bag 80. The user can now place any telecommunication accessory within the first pocket-type compartment 112 on the inner wall surface 110 of the outer flap 96. Alternatively, the user can also place other telecommunication accessories within the second pocket-type compartment 120 on the inner wall surface 118 of the front outer flap 102, as depicted in FIGS. 1 and 2 of the drawings. The user then closes the outer flap 96 in conjunction with the outer rear and top panels 84 and 86 using the first zipper member 100, a shown in FIGS. 3 and 8 of the drawings. The user then proceeds to transport the television tote bag apparatus 10 to the passenger vehicle 18 using the carrying strap member 148.

Once the television tote bag apparatus 10 is placed on the center armrest 16 of the passenger vehicle 18, the user can now utilize the harness strapping system 152 for securing and holding the TV unit 12 within the tote bag apparatus 10 on the center armrest 16 between the front seats 14a and 14b of the passenger vehicle 18, as shown in FIG. 2. The user then proceeds to attach the first hook and loop strip 170 of the headrest attachment section 166 of the first harness detachable strap 154 to the headrest 15a of the front driver's seat 14a, and then the user proceeds to attach the second hook and loop strip 172 of the headrest attachment section 168 of the second harness detachable strap 156 to headrest 15b of the front passenger's seat 14b, as shown in FIGS. 2, 14 to 17b. The user then connects each of the first ends 162 of the third and fourth detachable attachment straps 158 and 160 to each of the connection buckles 178 and 180 and then tightens each of the adjustment strap buckles 176 and 176 for securing and holding the television tote bag 10 to the center armrest 16 of passenger vehicle. The next step has the user attaching the second ends 164 of the detachable attachment straps 154 to 160 to corresponding strap connecting buckles 146 located on each side sections 126 and 128 of the external structural support member 124 of outer tote bag 80, as shown in FIGS. 2 and 14 of the drawings.

During actual operation of the TV unit 12, the user opens the front outer flap 102 from the outer front panel 82 via the second outer zipper member 106 in order to access the controls 12c on the front side of the TV unit 12. The user can also remove any necessary accessories from either of the first and second pocket-type compartments 112 and 120 on inner wall surfaces 110 and 118 of the outer flap 96 and front outer flap 102, respectively.

ADVANTAGES OF THE PRESENT INVENTION

Accordingly, an advantage of the present invention is that it provides for a television tote bag that gives the user a unique and novel carrying and fastening system being especially designed for remotely transporting telecommunication equipment for portable use. In particular, the present invention provides for an apparatus for transport of such devices that include but are not limited to televisions (TVs), television video cassette recorder (VCR) units, combined TV and DVD units, computer monitors and equipment, video telephones, and DVD devices, etc. for use both separately or in combination with each other and with other peripheral and accessory equipment.

Another advantage of the present invention is that it provides for a television tote bag for the transport of portable telecommunications equipment for use away from the home or office.

Another advantage of the present invention is that it provides for a television tote bag being designed and constructed to protect, organize, fasten and strap the TV unit during transportation and use.

Another advantage of the present invention is that it provides for a television tote bag that is easily fastened and strapped to the front seats of a moving vehicle and firmly positioned and secured on the center arm rest of the vehicle in order to minimize vibration for viewing the TV unit by passengers seated in the rear seats of the moving vehicle.

Another advantage of the present invention is that it provides for a television tote bag that can be designed and configured for use in moving vehicles such as automobiles, jeeps, minivans, vans, sport utility vehicles, recreational vehicles, campers, limos, boats, recreational aircraft and the like.

Another advantage of the present invention is that it provides for a television tote bag that enables the users to safely bring along such fragile telecommunication equipment (i.e. TV monitors) for use in a variety of remote settings.

Another advantage of the present invention is that it provides for a television tote bag that is of a two part construction having an inner bag and an outer bag fitted together for increased internal and external structural support for housing of the TV unit therein.

Another advantage of the present invention is that it provides for a television tote bag that incorporates a unique and improved construction and design in terms of size, modularity, materials, water resistant integrity, internal and external structural support, remote power supply capability, user and equipment access, storage capacity, and design compatibility with the transportation medium such as a vehicle and/or platform configuration of the vehicle in order to overcome the problems posed by the prior art.

A further advantage of the present invention is that it provides for a television tote bag that is capable of withstanding everyday wear and tear, as well as being secure, safe, efficient, durable and easy to use.

A still further advantage of the present invention is that it provides for television tote bag that can be mass produced in automated and economical manner and is readily affordable by the consumer.

A latitude of modification, change, and substitution is intended in the foregoing disclosure, and in some instances, some features of the invention will be employed without a corresponding use of other features. Accordingly, it is appropriate that the appended claims be construed broadly and in a manner consistent with the spirit and scope of the invention herein.

What is claimed is:

1. A tote bag apparatus for securing a telecommunication device within a passenger vehicle between a pair of seats, comprising:

a) an inner bag having a partial rear panel, a top panel, a bottom panel and a pair of side panels for forming an interior space having a generally rectangular shape;

b) said inner bag having a front opening for receiving a telecommunication device within said interior space of said inner bag;

c) said top panel having one or more adjustable closure flaps for opening and closing said top panel for adjusting the size of said interior space of said inner bag, and said interior space of said inner bag being used for receiving and holding different sizes of a telecommunication device therein;

d) an outer tote bag having an outer front panel, an outer rear panel, an outer top panel, an outer bottom panel, an outer side panels for forming an outer bag interior space having a generally rectangular space;

e) said outer rear panel and said outer top panel having an outer flap and a first outer flap opening for receiving said inner bag and telecommunication device within said outer bag interior space of said outer tote bag;

f) said outer front panel having a front outer flap and a second outer flap opening for accessing the telecommunication device;

g) strap connecting means on said outer tote bag for connecting detachable straps thereto;

h) a harness strapping system having a plurality of detachable straps for connecting one end of said detachable straps to said strap connecting means on said outer tote bag; and i) said plurality of detachable straps being removably attached at their other ends to said strap connecting means on said outer tote bag.

2. A tote bag apparatus in accordance with claim 1, wherein said partial rear panel includes a window opening for accessing controls on the rear side of the telecommunication device.

3. A tote bag apparatus in accordance with claim 1, wherein said adjustable closure flaps include hook and loop fasteners for closing said adjustable closure flaps together.

4. A tote bag apparatus in accordance with claim 1, wherein said bottom panel of said inner bag includes an inner wall surface and an outer wall surface having first attachment means thereon.

5. A tote bag apparatus in accordance with claim 4, wherein said first attachment means include a plurality of fastener strips on said outer wall surface of said bottom panel.

6. A tote bag apparatus in accordance with claim 5, wherein said plurality of fastener strips on said outer wall surface of said bottom panel being adjacent to said front opening of said front panel of said inner bag.

7. A tote bag apparatus in accordance with claim 1, wherein said inner wall surface of said bottom panel of said inner bag detachably receives a base stiffner member for supporting the telecommunication device thereon.

8. A tote bag apparatus in accordance with claim 1, wherein said inner bag is made from flexible materials such as canvas, polyesters, nylons, cotton and combinations thereof.

9. A tote bag apparatus in accordance with claim 1, wherein said outer tote bag includes a reinforcing external structural support member attached to said outer side panels and said outer bottom panel for external structural support when holding of the telecommunication device within said tote bag apparatus.

10. A tote bag apparatus in accordance with claim 1, wherein said outer tote bag includes a carrying strap member for carrying of the tote bag apparatus and the telecommunication device to and from the passenger vehicle.

11. A tote bag apparatus in accordance with claim 9, wherein said carrying strap member is connected to said external structural support member.

12. A tote bag apparatus in accordance with claim 1, wherein said outer rear panel and said outer top panel in conjunction with first said outer flap includes a first outer zipper member for opening and closing first outer flap opening with said outer flap on said outer rear panel and said outer top panel of said outer tote bag.

13. A tote bag apparatus in accordance with claim 1, wherein said outer front panel in conjunction with said front outer flap includes a second outer zipper member for opening and closing said second outer flap opening with said front outer flap on said outer front panel of said outer tote bag.

14. A tote bag apparatus in accordance with claim 1, wherein said outer flap includes a third outer zipper member for accessing the controls on the rear side of the telecommunication device by a user.

15. A tote bag apparatus in accordance with claim 1, wherein said outer flap includes a rear mesh window.

16. A tote bag apparatus in accordance with claim 1, wherein said outer flap includes an inner wall surface having a first pocket-type compartment with a first inner zipper member thereon for opening and closing said first pocket-type compartment thereto; said first pocket-type compartment for storing of telecommunication accessories therein.

17. A tote bag apparatus in accordance with claim 1, wherein said outer front flap includes an inner wall surface having a second pocket-type compartment with a second inner zipper member thereon for opening and closing said second pocket-type compartment thereto; said second pocket-type compartment for storing of telecommunication accessories therein.

18. A tote bag apparatus in accordance with claim 9, wherein said strap connecting means include a plurality of strap connecting buckles connected to said external structural support member.

19. A tote bag apparatus in accordance with claim 9, wherein said external structural support member of said outer bottom panel includes an outer wall surface having four spaced-apart gripping feet attached to corners of said outer wall surface.

20. A tote bag apparatus in accordance with claim 1, wherein said plurality of detachable straps of said harness strapping system includes a first harness detachable strap for attaching and securing to one of the seats, a second harness detachable strap for attaching and securing to the other seat, and third and fourth detachable attachment straps for attaching and holding to a center armrest of a passenger vehicle.

21. A tote bag apparatus in accordance with claim 20, wherein each of said harness detachable straps include a headrest attachment section having a hook and loop strip for wrapping around each of the headrests on the front seats of the passenger vehicle.

22. A tote bag apparatus in accordance with claim 20, wherein each of said detachable attachment straps include an adjustment strap buckle and a connection buckle for connecting to said one end of said detachable attachment strap; said adjustment strap buckle for adjusting the length of said detachable attachment strap being wrapped around the headrest of the passenger vehicle.

23. A tote bag apparatus in accordance with claim 1, wherein said outer bottom panel of said outer tote bag includes an inner wall surface having second attachment means thereon.

24. A tote bag apparatus in accordance with claim 23, wherein said second attachment means include a plurality of fastener strips on said inner wall surface of said outer bottom panel.

25. A tote bag apparatus in accordance with claim 24, wherein said plurality of fastener strips on said inner wall surface of said outer bottom panel being adjacent to said second outer flap opening of said front outer flap of said outer tote bag.

26. A tote bag apparatus in accordance with claim 9, wherein said external structural support member is made from a flexible plastic material.

27. A tote bag apparatus in accordance with claim 1, wherein said outer tote bag is made from flexible materials such as canvas, polyester, nylons, cotton and combinations thereof.

28. A tote bag apparatus in accordance with claim 9, wherein said external structural support member includes a plurality of venting openings for venting of heat from the telecommunication devices during their operation.

* * * * *